United States Patent
Fang et al.

(10) Patent No.: US 10,141,833 B2
(45) Date of Patent: Nov. 27, 2018

(54) POWER MANAGEMENT METHOD CAPABLE OF PREVENTING AN OVER CURRENT EVENT BY PERFORMING A POWER CONTROL OPERATION

(71) Applicant: MEDIATEK INC., Hsin-Chu (TW)

(72) Inventors: Po-Chao Fang, Hsinchu (TW);
Ying-Ting Yang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 112 days.

(21) Appl. No.: 15/080,545

(22) Filed: Mar. 24, 2016

(65) Prior Publication Data

US 2017/0040884 A1   Feb. 9, 2017

Related U.S. Application Data

(60) Provisional application No. 62/201,054, filed on Aug. 4, 2015.

(51) Int. Cl.
*H02M 1/32* (2007.01)
*G06F 1/32* (2006.01)

(52) U.S. Cl.
CPC .............. *H02M 1/32* (2013.01); *G06F 1/324* (2013.01); *G06F 1/3206* (2013.01); *G06F 1/3237* (2013.01); *Y02D 10/126* (2018.01); *Y02D 10/128* (2018.01)

(58) Field of Classification Search
CPC .. H02M 1/32; Y02B 60/1217; Y02B 60/1221; G06F 1/3206; G06F 1/3237; G06F 1/324
USPC ........................................................ 307/131
See application file for complete search history.

(56) References Cited

U.S. PATENT DOCUMENTS

| | | | |
|---|---|---|---|
| 6,304,978 B1 | 10/2001 | Horigan et al. | |
| 7,511,437 B2 * | 3/2009 | Lys | H02M 1/4225 315/224 |
| 7,595,615 B2 * | 9/2009 | Li | H02M 1/32 323/277 |
| 7,990,740 B1 * | 8/2011 | Notohamiprodjo | H02M 1/4225 363/59 |
| 8,271,819 B2 * | 9/2012 | Breen, III | G06F 1/28 327/143 |
| 9,178,415 B1 * | 11/2015 | Kost | H02M 3/00 |
| 9,413,159 B2 * | 8/2016 | Ueta | H02H 5/048 |

(Continued)

FOREIGN PATENT DOCUMENTS

| | | |
|---|---|---|
| CN | 1804761 A | 7/2006 |
| CN | 102449894 A | 5/2012 |

(Continued)

OTHER PUBLICATIONS

State Intellectual Property Office, First Office Action regarding Chinese Patent Application No. 201610399311.9, dated Jun. 19, 2018.

*Primary Examiner* — Dinh T Le
(74) *Attorney, Agent, or Firm* — Han IP PLLC; Andy M. Han

(57) ABSTRACT

A power management method includes generating a power related value; notifying a power management controller if the power related value has passed a threshold; and performing a power control operation by the power management controller. The power control operation prevents an over current event.

15 Claims, 7 Drawing Sheets

(56) References Cited

U.S. PATENT DOCUMENTS

2007/0188958 A1* 8/2007 Sase .................. H02M 1/32
                                              361/93.1
2013/0265088 A1* 10/2013 Kelly ................. H02H 5/005
                                              327/142

FOREIGN PATENT DOCUMENTS

CN   101529361 A   11/2012
EP   2290495 A1    3/2011

* cited by examiner

POWER MANAGEMENT METHOD CAPABLE OF PREVENTING AN OVER CURRENT EVENT BY PERFORMING A POWER CONTROL OPERATION

CROSS REFERENCE TO RELATED APPLICATIONS

This application claims the benefit of U.S. provisional application No. 62/201,054 filed Aug. 4, 2015. The above-mentioned application is included in its entirety herein by reference.

BACKGROUND

With the evolution of advanced integrated chip (IC) fabrication technology, number of components and complexity of circuitry disposed on a chip are increasing, and the System-on-Chip (SoC) solution is therefore feasible. Also the operating voltages supplied to SoC chips are decreased to lower levels gradually, in order to achieve a more competitive product specification. When the required power consumption remains substantially unchanged, the reduction of operating voltage has made it difficult to guarantee the stability of output voltages of SoC chips, especially when drawing a large operating current. The instability of output voltages caused by a large operating current drawn by the chip is an over current event. A systematic solution for preventing the over current event is required in the field.

SUMMARY

An implementation of the present disclosure discloses a power management method. The power management method includes generating a power related value; notifying a power management controller if the power related value has passed a threshold; and performing a power control operation by the power management controller. The power control operation prevents an over current event.

Another implementation of the present disclosure discloses a power management system. The power management system includes a function unit, a power meter and a power management controller. The power meter is coupled to the function unit for generating a power related value corresponding to the function unit. The power management controller is coupled to the power meter for performing a power control operation for preventing an over current event when being notified by the power meter. The power meter notifies the power management controller when the power related value has passed a threshold.

These and other objectives of the present disclosure will no doubt become obvious to those of ordinary skill in the art after reading the following detailed description of the preferred implementation that is illustrated in the various figures and drawings.

DETAILED DESCRIPTION

Figure 1:
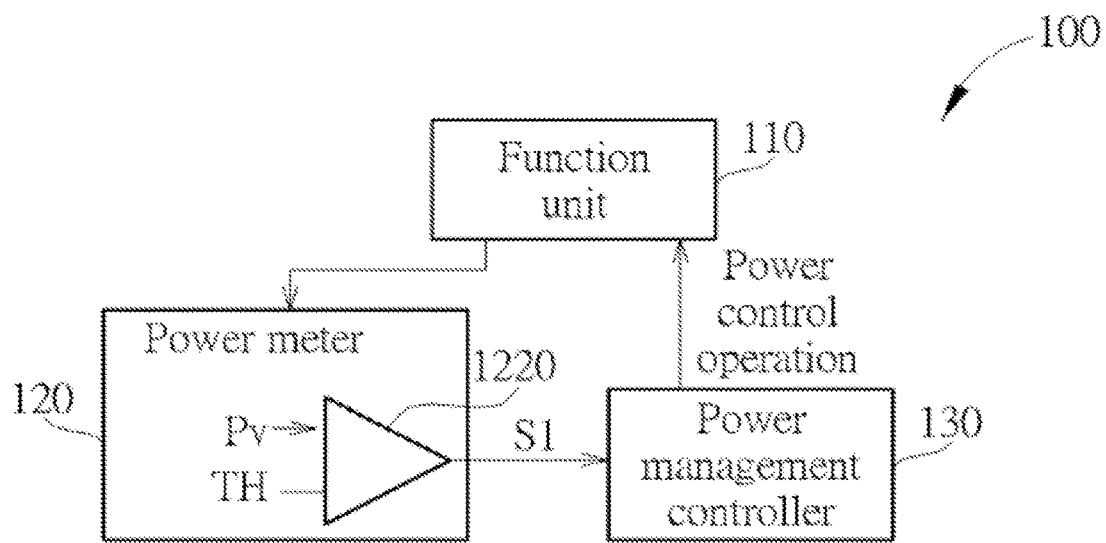
FIG. 1 illustrates a power management system according to an implementation of the present disclosure.

FIG. 1 illustrates a power management system 100 according to an implementation of the present disclosure. The power management system 100 may include a function unit 110, a power meter 120 and a power management controller 130. The power meter 120 may be coupled to the function unit 110 for generating a power related value Pv corresponding to the operation of the function unit 110. The power management controller 130 may be coupled to the power meter 120 for performing a power control operation for preventing an over current event when being notified by the power meter 120. According to an implementation of the present disclosure, the power meter 120 may notify the power management controller 130 by sending a notification signal S1. The power meter 120 may notify the power management controller 130 when the power related value Pv has exceeded a threshold TH. The power meter 120 may include a comparator unit 1220 configured to check whether the power related value Pv has passed the threshold TH, and generating the foresaid notification signal S1.

Figure 2:
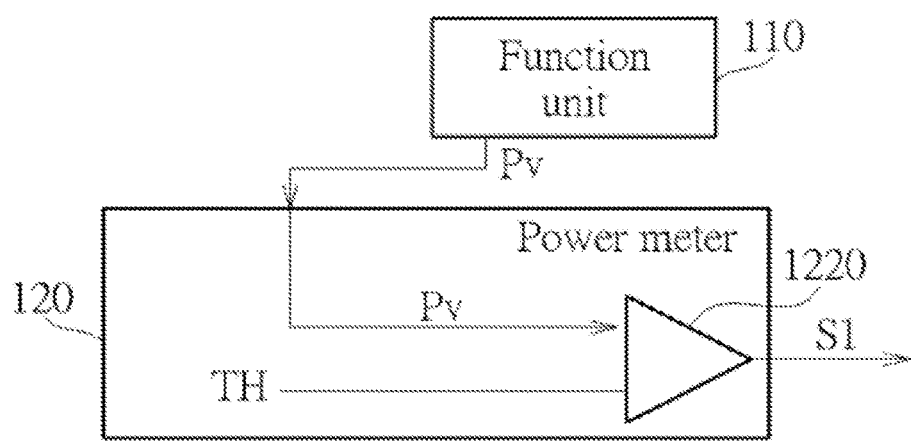
FIG. 2 illustrates a schematic diagram of the power meter and the function unit according to an implementation of the present disclosure.

FIG. 2 illustrates a schematic diagram of the power meter 120 and the function unit 110 according to an implementation of the present disclosure. In FIG. 2, the power meter 120 gets the power related value Pv by sampling the function unit 110. That is to say, the power related value Pv may be sampled and obtained from the function unit 110. The power related value Pv shown in FIG. 2 may include a current level and/or a voltage level corresponding to the operating current drawn by the function unit 110. The power related value Pv may be sampled by an electrical digital power meter or a detector designed for sampling a current value and/or a voltage value.

Figure 3:
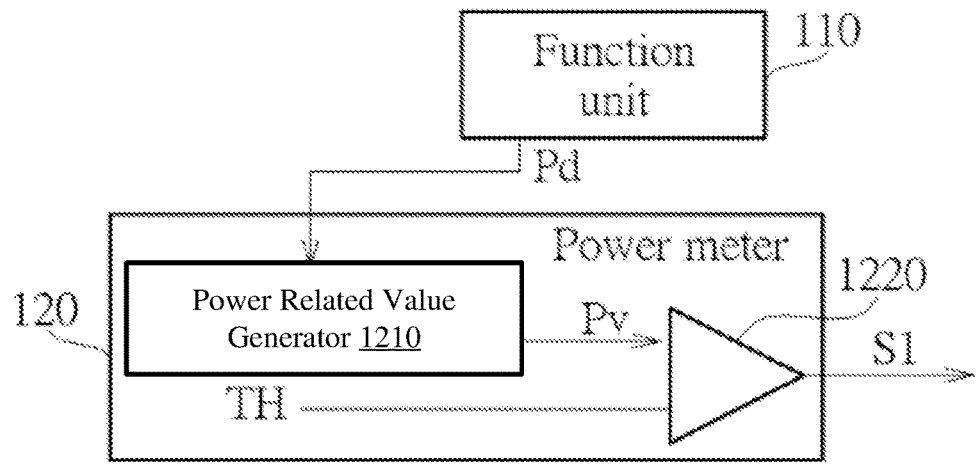
FIG. 3 illustrates a schematic diagram of the power meter and the function unit according to another implementation of the present disclosure.

FIG. 3 illustrates a schematic diagram of the power meter 120 and the function unit 110 according to another implementation of the present disclosure. In FIG. 3, a power index Pd may be sampled and collected to a power related value generator 1210 to be post-processed for generating the power related value Pv. For example, when the sampled power index Pd is a detected voltage value, the power related value generator 1210 may perform an analog-to-digital operation, a power consumption calculation operation and a level determination operation to determine a corresponding power related value Pv. A set of lookup tables may be used in the process. The power related value Pv may then be compared with the threshold TH. In FIGS. 2-3, the power related value Pv may be an index proportional to the power consumption such as (but not limited to) a current level, a voltage level, a data rate, an active duty parameter according to implementations of the present disclosure.

Figure 4:
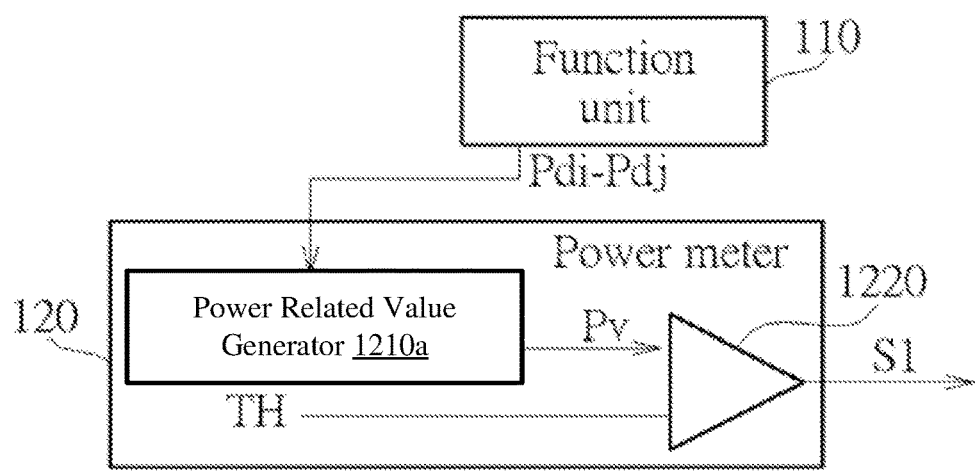
FIG. 4 illustrates a schematic diagram of the power meter and the function unit according to yet another implementation of the present disclosure.

FIG. 4 illustrates a schematic diagram of the power meter 120 and the function unit 110 according to yet another implementation of the present disclosure. In FIG. 4, the power meter 120 is used for generating the power related value Pv by sampling a plurality of power indices Pdi-Pdj from the function unit 110 for generating a slew rate from the plurality of power indices Pdi-Pdj. In FIG. 4, the power indices Pdi-Pdj may be indices proportional to the power consumption such as current levels, voltage levels, data rates, active duty parameters according to implementations of the present disclosure. The power related value Pv may be the generated slew rate. In FIG. 4, a power related value generator 1210a generates slew rate from the sampled power indices Pdi-Pdj The power indices Pdi-Pdj may include a plurality of current levels and/or a plurality of voltage levels corresponding to the operating current drawn by the function unit 110. The power indices Pdi-Pdj may be sampled by an electrical digital power meter or a detector designed for sampling current values and/or voltage values. The slew rate mentioned here may be a rate of change per time unit. For example, if a first power index is sampled as 5.2 volt, a second power index is sampled as 5.8 volt, and the time interval between two samplings is 500 msec, then the slew rate is 1.2 volt/sec.

In this example, the obtained slew rate 1.2 volt/sec may be used as the power related value Pv to be compared with the threshold TH, or be post-processed for generating the power related value Pv.

As mentioned above, the power meter 120 shown in FIGS. 1-4 may be or include a current detector, a voltage detector, a bandwidth detector, an active duty detector or a power index detector for sampling at least a power index or power related value (e.g. a current level or a voltage level) corresponding to the power consuming status of the function unit 110.

Figure 5:
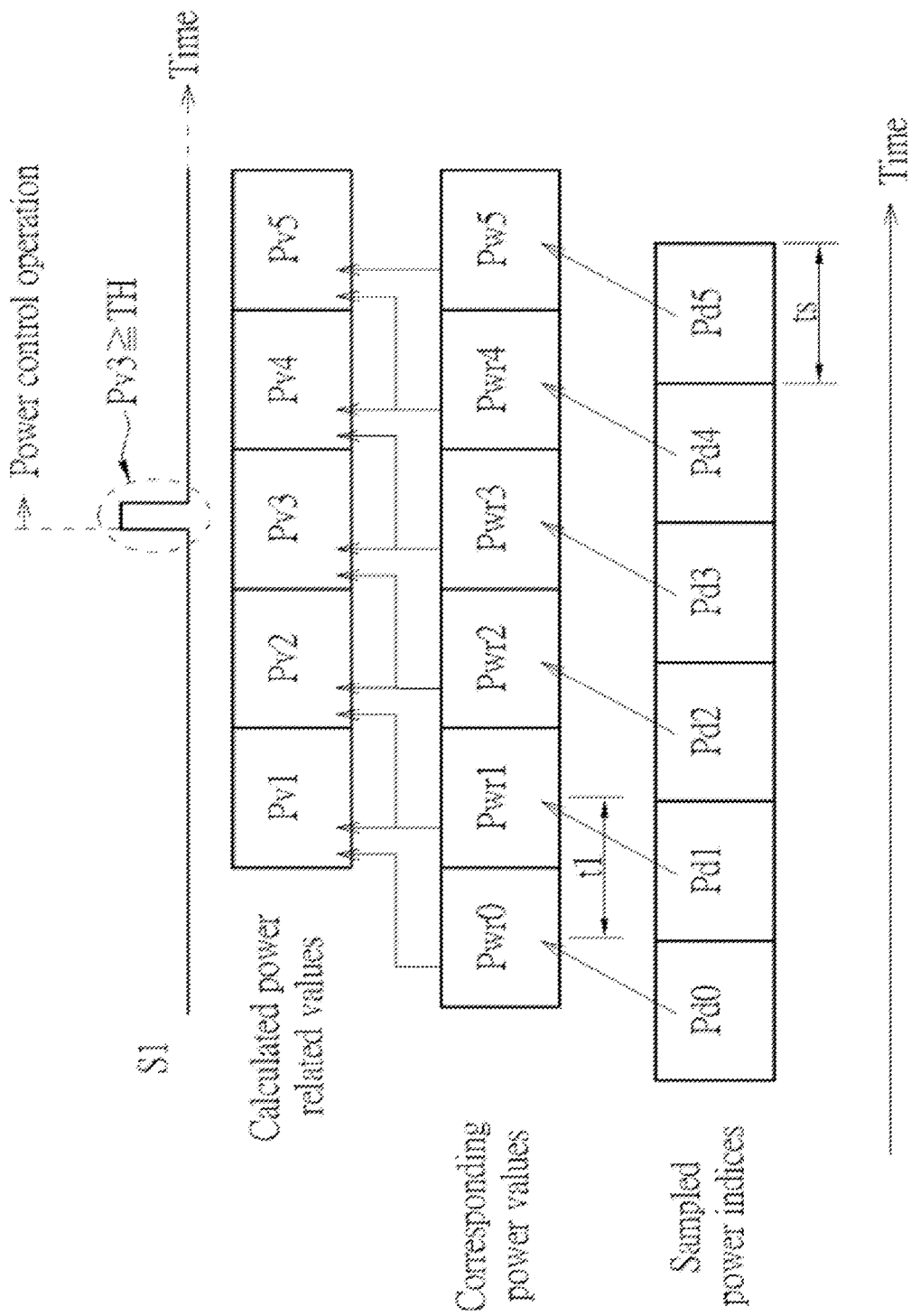
FIG. 5 illustrates the generation of the foresaid slew rate according to FIG. 4 and an implementation of the present disclosure.

FIG. 5 illustrates the generation of the foresaid slew rate according to FIG. 4 and an implementation of the present disclosure. Taking the power indices Pd0-Pd5 for example (where the Pd0-Pd5 may be a set of the Pdi-Pdj), the power indices Pd0-Pd5 may be sampled sequentially by the power meter 120. Since each of a power value Pwr1-Pwr5 may be proportional to each of the power indices Pd0-Pd5, the power values Pwr1-Pwr5 may be calculated by utilizing the power indices Pd0-Pd5. Each of the power related values Pv1-Pv5 may correspond to the power related value Pv shown in FIGS. 1-4. The power related values Pv1-Pv5 may then be obtained by performing slew rate calculation. For example, the power related values Pv1 may correspond to the slew rate of the power values Pwr1 and Pwr2. Each power index Pd may be a parameter corresponding to a power related event such as a sampled data rate or an observed bandwidth in use. Each power index Pd may be positively correlated with actual power consumption. A corresponding power value Pwr corresponding to a power index Pd may be derived according to the power index Pd and experience. Each power related value Pv may be related to the variation of the power values Pwr. For example, when a parameter t1 (shown in FIG. 5) may be a predetermined time interval, the power related value Pv1 may be positively correlated with the variation of Pwr0 and Pw1. Similarly, the power related value Pv2 may be calculated using the power values Pwr1 and Pwr2, the power related value Pv3 may be calculated using the power values Pwr2 and Pwr3, and so on. The power related value Pv is not limited to be generated by slew rate calculation described above, a lookup table may be used to obtained the power related value Pv in other implementations of the present disclosure. In the example shown in FIG. 5, the power related values Pv1 and Pv2 fail to pass the threshold TH so that the notification signal S1 is unnecessary to be set active. However, the power related value Pv3 has passed the threshold TH (e.g. the power related value Pv3≥ the threshold TH) so that the risk of occurring an over current event is increased, the notification signal S1 is set active for notifying the power management controller 130 to perform a power control operation. In FIG. 5, the active state of the notification signal S1 is represented as a high state pulse as an example. The operation performed in FIG. 5 may be performed by the power related value generator 1210a in FIG. 4. The power indices may be sampled periodically in a predetermined frequency according to an implementation of the present disclosure. For example, the power indices Pd0-Pv5 may be voltage levels obtained by sampling from the function unit 100 every 50 msec. A time interval ts in FIG. 5 is to describe the sample time interval. The predetermined frequency may be programmable. When the frequency is programmed to be higher, the sensitivity may be increased.

Figure 6:
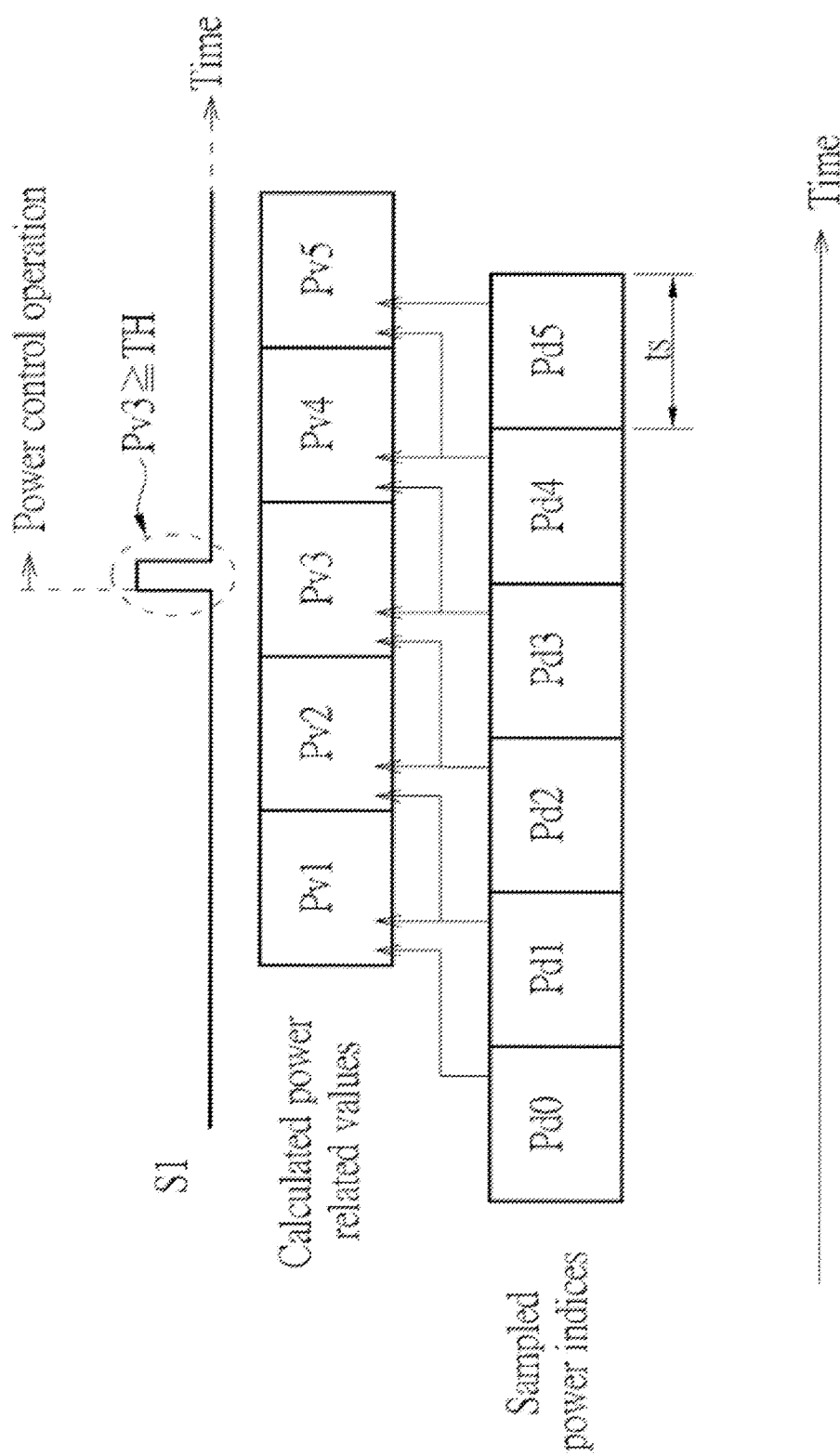
FIG. 6 illustrates another dynamic diagram for describing the generation of the foresaid slew rate according to FIG. 4 and another implementation of the present disclosure.

In FIG. 5, each power related value (e.g. any of the power related values Pv1-Pv5) corresponds to a slew rate calculated by using two power values (e.g. the power values Pwr1-Pwr2). However, as shown in FIG. 6, a power related value may be obtained by calculating the slew rate of two sampled power indices directly without calculating the power value first according to another implementation of the present disclosure. FIG. 6 illustrates another dynamic diagram for describing the generation of the foresaid slew rate according to FIG. 4 and another implementation of the present disclosure. In FIG. 6, the power related value Pv1 may be a slew rate calculated from the sampled power indices Pd0 and Pd1, the power related value Pv2 may be a slew rate calculated from the sampled power indices Pd1 and Pd2, and so on. Since the operating principle is similar to the example of FIG. 5, it is not described repeatedly. The operation performed in FIG. 6 may be performed by the power related value generator 1210a in FIG. 4.

Figure 7:
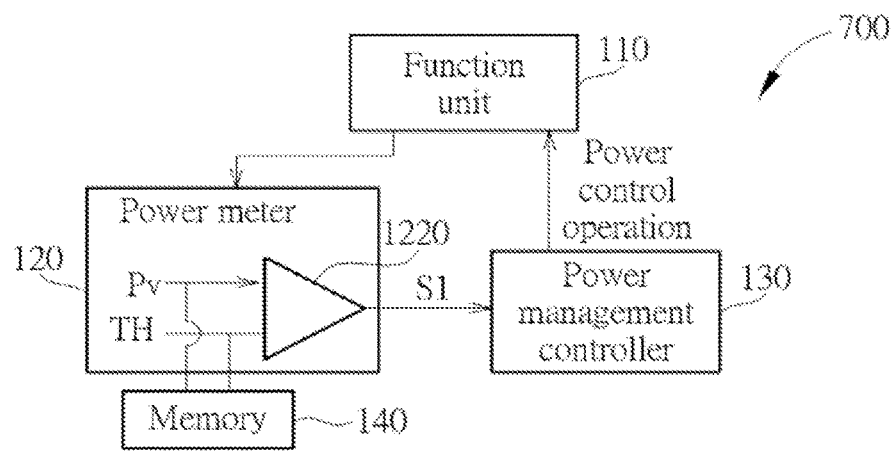
FIG. 7 illustrates a power management system according to another implementation of the present disclosure.

FIG. 7 illustrates a power management system 700 according to another implementation of the present disclosure. The power management system 700 may be similar to the power management system 100 shown in FIG. 1 but further include a memory 140. The memory 140 may be coupled to the power meter 120 and used to store the threshold TH and the power related value Pv. The power related value Pv and the used threshold TH may be stored in the memory 140 for statistic or debugging analysis. In another example, a set of values may be stored in the memory 140 and one of the stored values may be selected to be the threshold TH.

The function unit 110 may include electrical units made of digital circuitry, analog circuitry and/or memory units for executing specific functions. In particular, the function unit 110 may be a functional block consuming larger power and in need of drawing a large operating current in some scenarios. According to implementations of the present disclosure, the function units 110 may be a (but not limited to) a central processing unit (CPU), graphics processing unit (GPU) or BUS unit of an SoC. For example, when the function unit 110 is a GPU, and a set of complex images are processed by the function unit 110, a large operating current may be drawn by the function unit 110 in a short time so that the power related value Pv may pass the threshold TH, and the power management controller 130 may perform a power control operation for preventing an over current event and stabilizing the output voltage. According to an implementation of the present disclosure, the power management controller 130 may be implemented as an IC such as a power management IC (PMIC), or a specific functional hardware module in a chip. According to another implementation of the present disclosure, the power management controller 130 may include a control module and a power supply module for both controlling and providing power to the function unit 110.

The above mentioned power control operation may include the following operations:
(i) the power management controller 130 outputting a higher power output to the function unit 110 by entering a second mode from a first mode;
(ii) the power management controller 130 adjusting an operating frequency in a pulse width modulation (PWM) mode; or
(iii) the power management controller 130 throttling a system clock for a predetermined time interval for reducing a current drawn.

Figure 8:
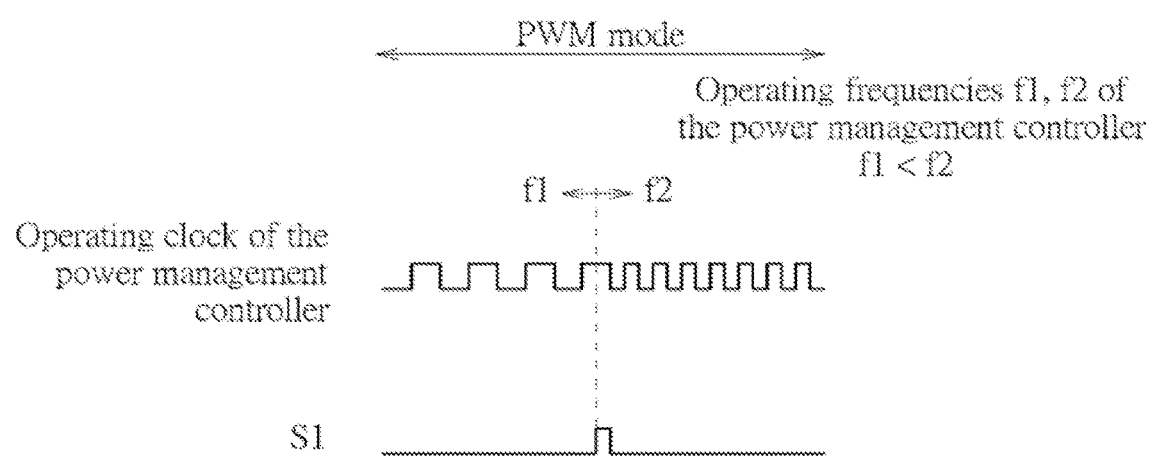
FIG. 8 illustrates a waveform diagram corresponding to the power control operation according to an implementation of the present disclosure.
Figure 9:
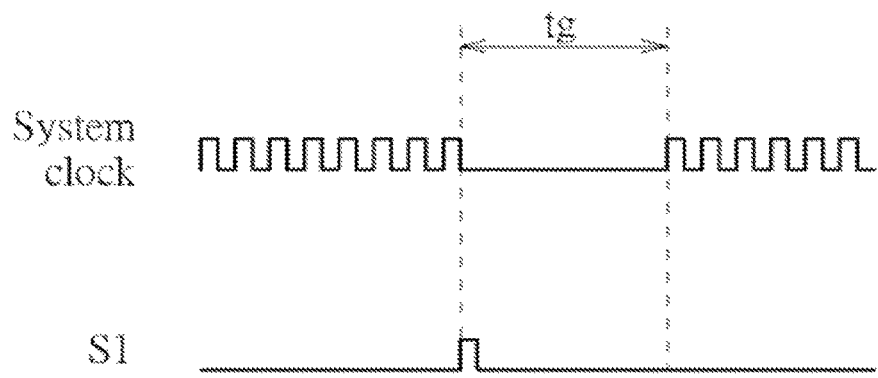
FIG. 9 illustrates a waveform diagram corresponding to a power control operation according to another implementation of the present disclosure.
Figure 10:
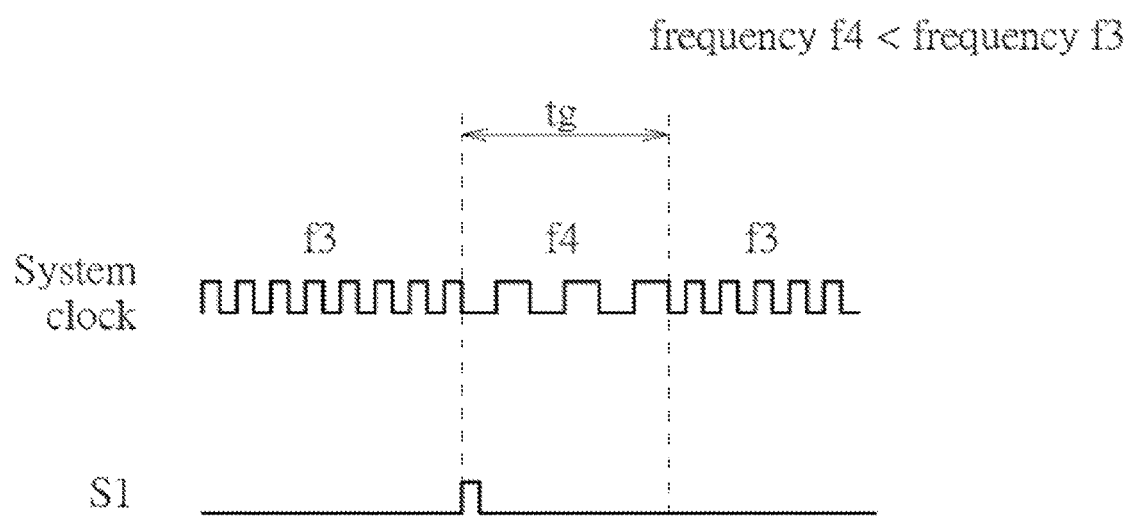
FIG. 10 illustrates a waveform diagram corresponding to a power control operation according to yet another implementation of the present disclosure.

In the operation (i), the first mode may be a pulse frequency modulation (PFM) mode and the second mode may be a pulse width modulation (PWM) mode according to an implementation of the present disclosure. Since the power management controller 130 may support a higher power output and better driving ability in the PWM mode than in the PFM mode, entering the PWM mode from the PFM mode may prevent an over current event and related IR-drop (i.e. a voltage drop produced by a current (I) passing through a resistance with a resistance value (R)). Regarding the operation (ii), FIG. 8 may be referred as an example. FIG. 8 illustrates a waveform diagram corresponding to the power control operation according to an implementation of the present disclosure. In FIG. 8, the waveform of an operating clock of the power management controller is shown. As shown in FIG. 8, when the notification signal S1 is set active, the power management controller 130 may adjust the operating frequency of the power management controller 130 to be a frequency f2 from a frequency f1, where the frequency f2 may be higher than a frequency f1. By applying a higher operating frequency, the power management controller 130 may increase the power supplying ability for the function unit 110 to process a heavy duty with lower risk of occurring an over current event. Regarding the operation (iii), FIGS. 9 and 10 may be referred as examples. FIG. 9 illustrates a waveform diagram corresponding to a power control operation according to another implementation of the present disclosure. In FIG. 9, when the notification signal S1 is set active, the power management controller 130 may throttle to stop the system clock for a predetermined time interval tg, and the operating current drawn by the function unit 110 may be reduced in the time interval tg. FIG. 10 illustrates a waveform diagram corresponding to a power control operation according to yet another implementation of the present disclosure. In FIG. 10, when the notification signal S1 is set active, the power management controller 130 may throttle the system clock for a predetermined time interval tg so that the frequency of the system clock is changed to a frequency f4 from a frequency f3 in the predetermined time interval tg. The frequency f4 may be lower than the frequency f3 for reducing the drawn current. For example, frequency f3 may be a multiple of the frequency f4 so that the frequency f3 may be m times frequency f4, where m is a positive number and not limited to be an integer.

In FIGS. 5-10, the active state of the notification signal S1 is represented as a high state pulse as an example. However, according to other implementations, the active state of the notification signal S1 may be a constant high state or a constant low state, and the foresaid power control operation may be performed only during the interval in which the notification signal S1 is set active. In all cases, reasonable state transition time and response time may be required.

Figure 11:
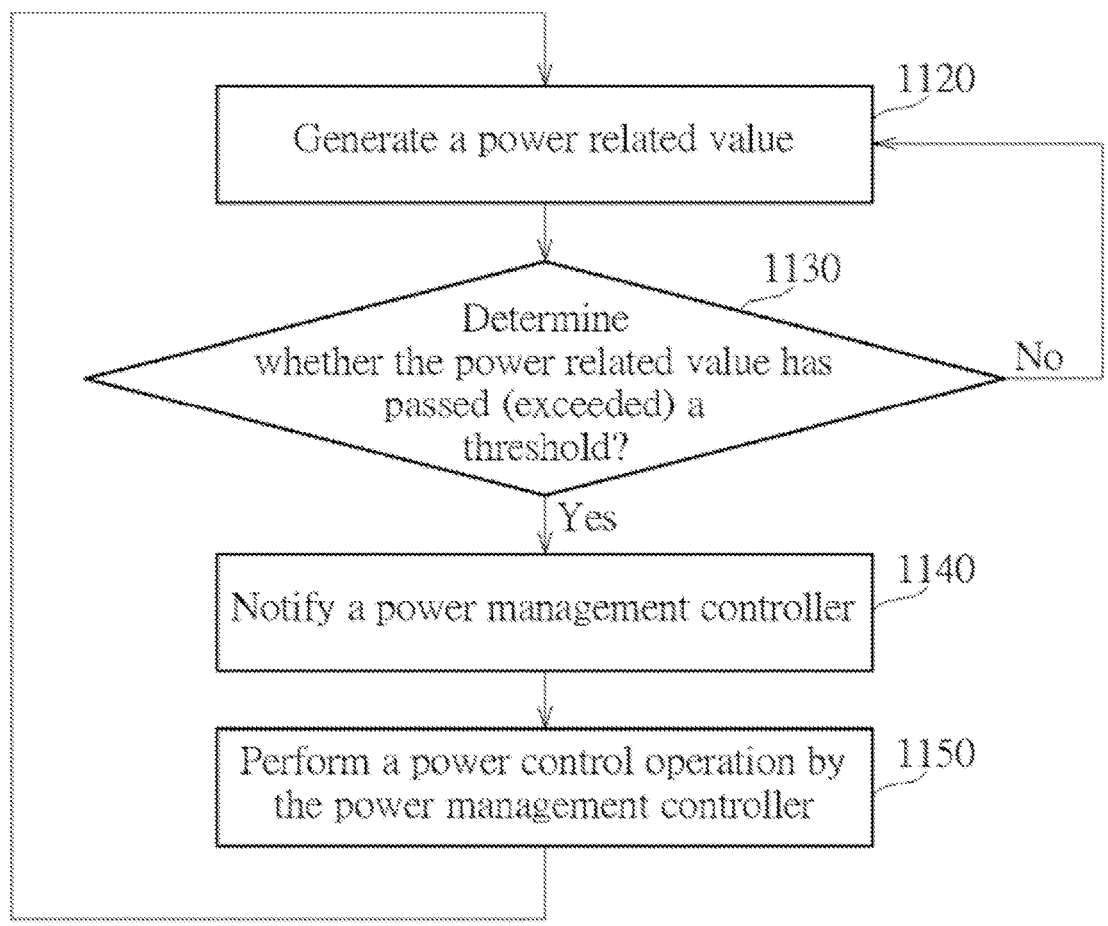
FIG. 11 illustrates a flow chart of a power management method according to an implementation of the present disclosure.

FIG. 11 illustrates a flow chart of a power management method 1100 according to an implementation of the present disclosure. FIG. 11 may be referred with referring to FIGS. 1 and 7. The power management method 1100 may include the following steps:
Step 1120: generate a power related value Pv;
Step 1130: determine whether the power related value Pv has passed (exceeded) a threshold TH? If so, enter step 1140; else enter step 1120;
Step 1140: notify a power management controller 130;
Step 1150: perform a power control operation by the power management controller 130, go to step 1120.

As described above, the power related value Pv may be a power index sampled from the function unit 110 or a slew rate obtained by using at least two power indices sampled from the function unit 110, and the power control operation may be practiced with one of the foresaid operations (i)-(iii). Hence, it is not described repeatedly.

In summary, by using the power management method and the power management system disclosed according to implementations of the present disclosure, the power related value Pv may be generated and compared with the threshold TH for detecting scenarios corresponding to a high drawn current and a high risk of an over current event, and the power control operation may be performed so that the over current event and an unwanted IR drop caused by the over current event may be effectively prevented. The effect of stabilizing the functional performance and output voltage of an SoC system is significant.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A power management method comprising:
generating a power related value representative of a current level or a voltage level;
notifying a power management controller when the power related value has passed a threshold;
storing the threshold and the power related value in a memory coupled to an electrical digital power meter; and
performing a power control operation by the power management controller responsive to the power management controller being notified;
wherein the power control operation is related to power output increase, operating frequency adjustment or system clock rate adjustment.

2. The power management method of claim 1 wherein generating the power related value comprises sampling the power related value from a function unit.

3. The power management method of claim 2, wherein the power related value is sampled by the electrical digital power meter.

4. The power management method of claim 1 wherein generating the power related value comprises:
  obtaining, from a function unit, a plurality of power indices that are indicative of an amount of power consumption; and
  generating a slew rate from the plurality of power indices; wherein the power related value is the slew rate.

5. The power management method of claim 4, wherein the plurality of power indices are sampled by the electrical digital power meter.

6. The power management method of claim 4, wherein the plurality of power indices are obtained periodically in a programmable frequency.

7. The power management method of claim 1, wherein the power management controller performing the power control operation comprising:
  the power management controller outputting a higher power output to a function unit by entering a second mode from a first mode.

8. The power management method of claim 7, wherein the first mode is a pulse frequency modulation (PFM) mode and the second mode is a pulse width modulation (PWM) mode.

9. The power management method of claim 1, wherein the power management controller performing the power control operation comprising:
  the power management controller adjusting an operating frequency in a pulse width modulation (PWM) mode.

10. The power management method of claim 1, wherein the power management controller performing the power control operation comprising:
  the power management controller reducing a rate of a system clock for a predetermined time interval such that an amount of operating current drawn by a function unit is reduced.

11. A power management system comprising:
  a function unit;
  a power meter coupled to the function unit and configured to generate a power related value corresponding to the function unit, the power related value representative of a current level or a voltage level;
  a power management controller coupled to the power meter and configured to perform a power control operation when being notified by the power meter that the power related value has passed a threshold; and
  a memory coupled to the power meter and configured to store the threshold and the power related value,
  wherein the power control operation is related to power output increase, operating frequency adjustment or system clock rate adjustment.

12. The power management system of claim 11, wherein the power meter is configured to generate the power related value by sampling the power related value from the function unit.

13. The power management system of claim 11, wherein the power meter is configured to generate the power related value by obtaining a plurality of power indices from the function unit and generating a slew rate from the plurality of power indices that are indicative of an amount of power consumption, and wherein the power related value is the slew rate.

14. The power management system of claim 11, wherein the power management controller is an integrated circuit.

15. The power management system of claim 11, wherein the power meter is a current detector, a voltage detector, a bandwidth detector, an active duty detector or a power index detector.

* * * * *